United States Patent [19]
Saito

[11] Patent Number: 4,884,610
[45] Date of Patent: Dec. 5, 1989

[54] DEPRESSED RADIAL TIRE
[75] Inventor: Kenji Saito, Kobe, Japan
[73] Assignee: Sumitomo Rubber Industries, Ltd., Hyogo, Japan
[21] Appl. No.: 215,385
[22] Filed: Jul. 5, 1988
[30] Foreign Application Priority Data
  Jul. 6, 1987 [JP] Japan .................... 62-168346
[51] Int. Cl.$^4$ .............................. B60C 3/04
[52] U.S. Cl. .................... 152/454; 152/538
[58] Field of Search .......... 152/454, 456, 455, 538, 152/539

[56] References Cited
U.S. PATENT DOCUMENTS
  4,076,066 2/1978 Verdier ..................... 152/454
  4,669,519 6/1987 Togashi et al. .......... 152/454

FOREIGN PATENT DOCUMENTS
  56-3806 1/1981 Japan .

Primary Examiner—Raymond Hoch
Attorney, Agent, or Firm—Birch, Stewart, Kolasch & Birch

[57] ABSTRACT

A depressed radial tire having an aspect ratio of 65% or less, wherein a carcass line (5) ranging from a part (A) under the edge of a belt (6) to a part (C) about the upper end of a bead core (4) comprises an upper arc (7) having the center inside the tire and a lower arc (8) having the center outside the tire; and the radius of curvature (R1) of the upper arc divided by the radius of curvature (R2) of the lower arc is less than 0.8, whereby riding comfort is improved at no sacrifice to the steering stability.

6 Claims, 5 Drawing Sheets (A)  (B)

DEPRESSED RADIAL TIRE

The present invention relates to a depressed radial tire having an aspect ratio of 65% or less, and more particularly to a carcass profile by which riding comfort is improved at no sacrifice to the steering stability.

DESCRIPTION OF THE BAKCGROUND ART

In general, pneumatic radial tires with metallic cord belt reinforcement are widely used because of their superior high-speed durability, steering stability, wear resistance and fuel economy. In order to further enhance these performances, especially steering stability, tires with a low aspect ratio have been recently used.

If the aspect ratio is lowered, the cornering power and the lateral stiffness of the tire are raised so that the steering staility of vehicles can be upgraded. Therefore, tires having an aspect ratio of 65% or 60% have increased in number, and further tires having an aspect ratio of 55% or 40% have already appeared.

Such depressed radial tires have, however, a common defect: uncomfortable riding. It is because the longitudinal stiffness as well as the above-mentioned lateral stiffness is increased as the aspect ratio is decreased, and impacts added from road surface to the tread are likely to propagate to the vehicle through the sidewalls, beads, a rim and an axle.

As a means of improving the riding comfort, reduction of belt stiffness such as the shortening of the belt width or reduction of modulus on belt cords, or the lessening of stiffness on the bead portion can be considered, but these manners cannot be put into effect without the sacrifice of the steering stability.

To solve these contradictory problems, materials of bead reinforcement and a carcass winding-up structure were disclosed in the Japanese Patent Publication No. 56-3806. This technique shows an effect in the tires having a conventional high aspect ratio, but it is insufficient in the tires having a low aspect ratio especially in depressed radial tyres having an aspect ratio of 65% or less.

SUMMARY OF THE INVENTION

It is therefore, an object of the present invention to improve the riding comfort in a depressed radial tire having an aspect ratio of 65% or less without spoiling the steering stability.

According to one aspect of the present invention, a depressed radial tire comprises a carcass having at least one ply of radially arranged cords turned up at its ends around bead cores, and a belt having at least two plies of metallic cords arranged radially outside the carcass, wherein a carcass line of the carcass ranging from a part (A) under the edge of the belt to a part (C) about the upper end of the bead core comprises an upper arc having the center inside the tire and a lower arc having the center outside the tire, and the radius of curvature of the upper arc divided by the radius of curvature of the lower arc is less than 0.8.

Here, the carcass line is defined as the center line of the carcass with regard to its thickness when the tire is assembled in a specified rim and the specified internal pressure is applied, regardless of the number of carcass ply.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

An embodiment of the present invention will now be described in detail referring to the attached drawings which are given by way of illustration only, and thus are not limitative of the present invention, and in which.

DETAILED DESCRIPTION OF THE PREFERRED EMBODIMENTS

Figure 1:
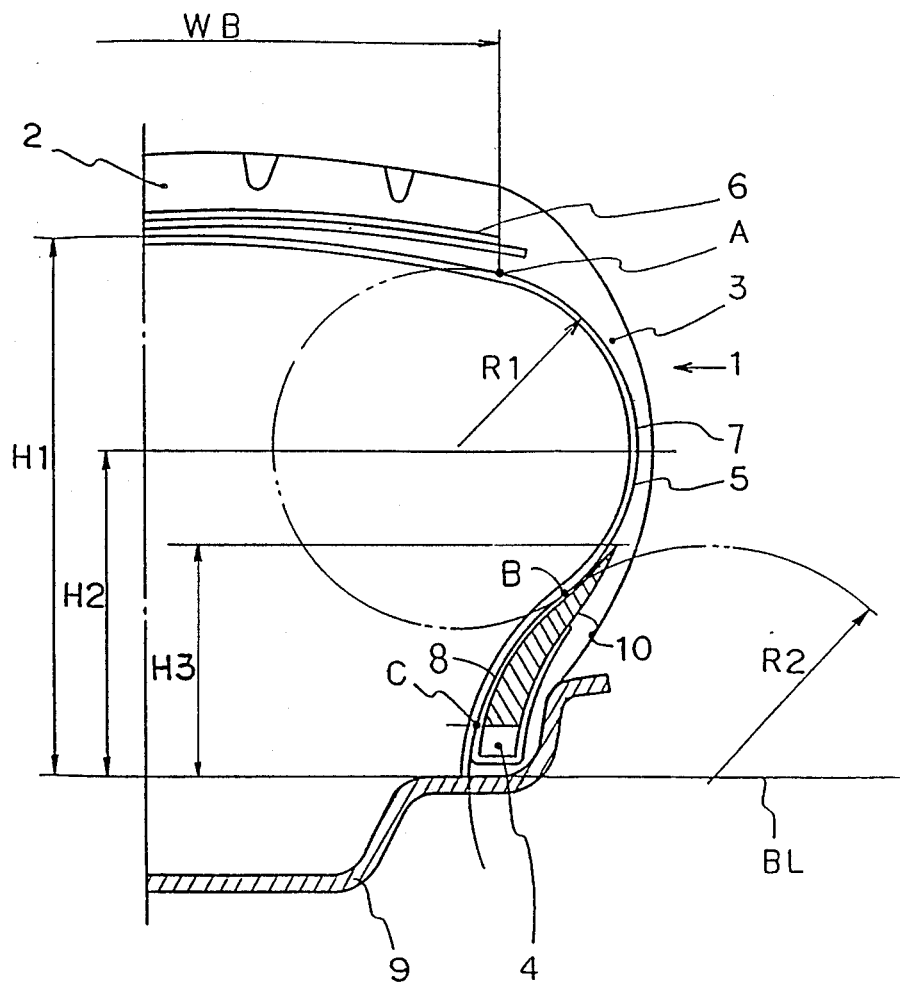
FIG. 1 is a lateral sectional view of one side from the equatorial plane of a depressed radial tire of the present invention.

Tire 1 of FIG. 1 is assembled in a specified rim 9 and inflated to a specified internal pressure.

The tire has an annular tread portion 2, a pair of bead portions, and a pair of sidewall portions 3 extending radially inward from both edges of the tread portion to the respective bead portions, and the tire comprises two bead cores 4 provided in the bead portions, a carcass 5, a tread rubber thereon and a belt 6 between the carcass and the tread rubber.

The carcass 5 is composed of at least one ply of cords extending through the tread portion and sidewall portions, and turned up at its ends around the bead cores to be secured thereto. In this embodiment, the carcass comprises one ply of cords, but plural plies may be accepted.

The cords of the carcass ply are made of organic fiber materials such as nylon, polyester and aromatic polyamide or metallic materials.

The belt 6 is composed of two plies of metallic cords, and located radially outside the carcass.

The cords of each ply are arranged at an angle of 15 to 30 degrees with respect to the circumferential direction of the tire, and the cords of each ply cross with those of the adjacent ply.

The belt in this invention may include three or more plies of metallic cores, and furthermore, a structure (not shown) having a reinforcing layer composed of organic fibers cords on its outermost part in the radial direction can be employed.

In FIG. 1, numeral 5 indicates both the carcass and the carcass line, wherein the carcass line is, as mentioned above, defined as the center line of the carcass when the tire is assembled in a specified rim and the specified internal pressure is applied.

RIDING COMFORT AND ASPECT RATIO

Figure 2:
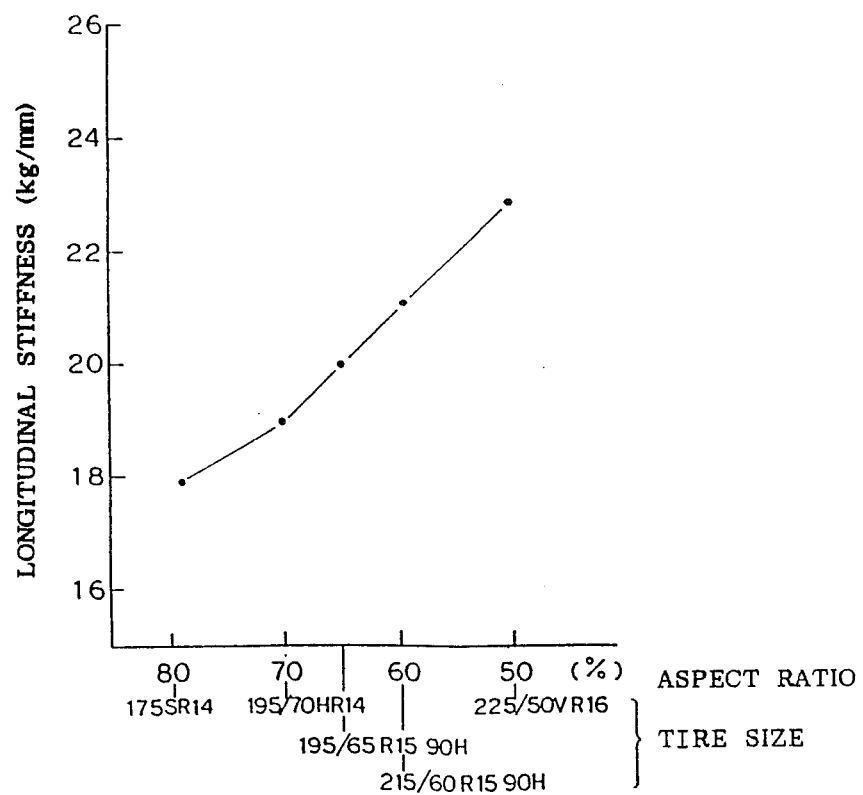
FIG. 2 is a graph showing the relation between the longitudinal stiffness and the aspect ratio.

One of the most important factors of determining the riding comfort is the longitudinal stiffness. FIG. 2 shows the relation between the longitudinal stiffness and the aspect ratio. As the aspect ratio becomes small, the longitudinal stiffness increases. This tendency is apparent especially where the aspect ratio is less than 65%.

Figure 3:
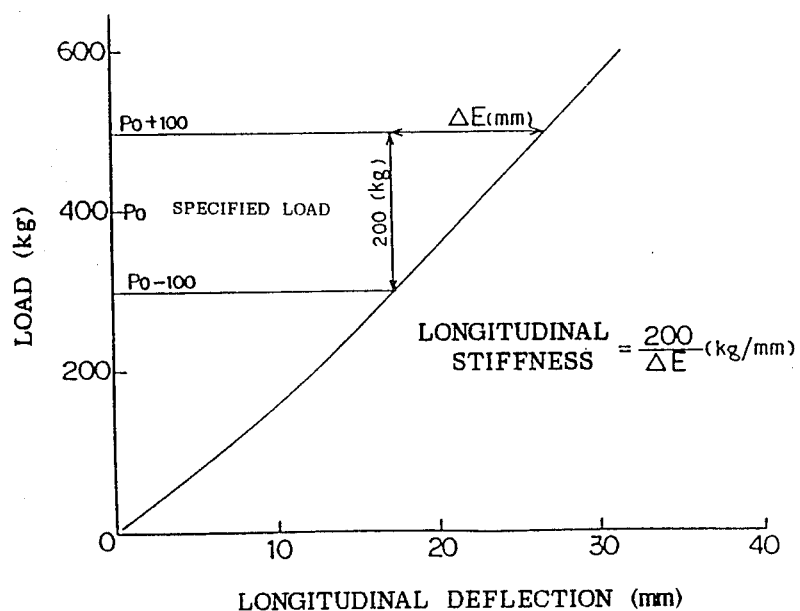
FIG. 3 is a graph explaining the longitudinal stiffness in the present invention.

As shown in FIG. 3, the longitudinal stiffness in this invention is defined as a quotient: a load fluctuation (200 kg) divided by the longitudinal deflection (delta E) when the tire is subjected to the load fluctuation from a specified load Po—100 kg to the specified load Po+100 kg. That is, the increase of longitudinal stiffness means the reduction of longitudinal deflection.

The inventor found out a shape in which the longitudinal deflection of the sidewall portions is raised without changing the length of the carcass line from a point A to a point C.

That is, the carcass line 5 between the point A and the point C should be composed of only two arcs: an upper arc 7 and a lower arc 8, and the radius R1 of curvature of the upper arc divided by the radius R2 of curvature of the lower arc should be less than 0.8. When the value is more than 0.8, the effect of increase of longitudinal deflection, that is, the lessening of longitudinal stiffness is almost nullified, so that it becomes meaningless to form said carcass line only by two arcs.

POINTS A AND C

The point A is an intersection between a perpendicular from a belt edge to the tire axis and the carcass line, wherein the belt edge is defined as an edge of the area where at least two belt plies are overlaid on the carcass. That is, the point a is the axially outermost end of the area (indicated by WB in FIG. 1) where the carcass is restricted by the belt. The point C is an intersection between a line drawn from the upper end of the bead core parallel to the axis of tire and the carcass line, which is a point on the carcass not changing its position even by the load and rotation.

UPPER ARC 7 AND LOWER ARC 8

The upper arc 7 is an arc having the center inside the tire, and the lower arc 8 is an arc having the center outside the tire. Accordingly, the carcass line between the point A and the point B has a point of inflection B. In other words, the upper arc forms a upper part between the points A and B, and the lower arc forms a lower part between the points B and C.

In this embodiment, the center of the upper arc is located on a line drawn parallel to the axis of tire—from the maximum width point at which the section width of the tire—becomes maximum, and the center of the lower arc is located on the bead base line, whereby the point of inflection B is located between the maximum width point and the point C.

Furthermore, the belt preferably satisfies the following relation:

$$(WB/H1) \times (\text{Aspect ratio}/100) > 0.8$$

wherein
WB is the belt width defined as a width of the area where at least two belt plies are overlaid, measured parallel to the tire axis; and
H1 is the sectional height of the carcass measured from the bead base line BL.

In case of narrow belt width where the value is less than 0.8, a preferable riding comfort can be easily obtained but the circumferetial stiffness of the shoulder portions of the tire falls down and it is hence difficult to keep the steering stability which is one of the features of the depressed tire.

The longitudinal deflection becomes larger when the radius R2 of lower arc is longer than the radius R1 of upper arc, but when R2 is excessively large, the part A-B occupied by the upper arc 7 becomes small to cause adverse effects. As a result, R2 is preferable to be less than 0.6 times of the sectional height H1 of the carcass. If R2 is less than 0.4 times of H1, it is difficult to set the value R1/R2 smaller than 0.8. From such a point, the radius R2 of the lower arc 8 is preferable to be in a range from 0.4 to 0.6 times of the sectional height H1 of the carcass.

The carcass line of the present invention can be obtained by setting required length of carcass, that is, length A-B+length B-C, the positions of points A, B and C, and R2 of the lower arc 8. As explained above, point A is the outermost point of the carcass line restricted by the belt 6, of which position is determined by the belt structure, and point C is determined by the position of the bead core. Point B and the radius R2 of the lower arc 8 are specified by the position of the bead core 4 and the bead reinforcing member 10.

Figure 5:
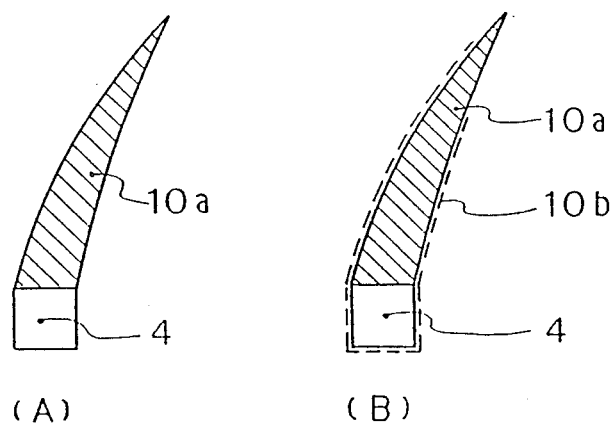
FIG. 5 is a sectional views showing examples of bead reinforcing members.

The bead reinforcing member 10 is to raise the bending stiffness in the lateral section, and has a shape by which the bending stiffness is decreased from the bead core radially outward. FIG. 5 shows examples of such a bead reinforcing member.

The bead reinforcing member of FIG. 5(A) comprises a bead apex 10a composed of rubber having a JIS(A) hardness of 74 to 95, disposed radially outside the bead core and having a tapering sectional shape.

The bead reinforcing member of FIG. 5(B) comprises the bead apex 10a and further organic fiber cords 10b covering the bead core 4 and the bead apex.

It is preferred to set the height H3 of this bead reinforcing member 10 at 4/5 or less of the height H at the maximum width point. When H3 exceeds 4/5 of H2, the bending stiffness at the part A-B increases and the longitudinal deflection at the part A-B decreases. It is better to place the upper end of the bead reinforcing member 10 radially outside the point B.

WORKING EXAMPLES

Test tires having specifications shown in Table 1 were produced as working examples of the present invention and reference tires, and indoor bench test and feeling test on actual cars were executed.

The feeling test was carried out by mounting the tires on a Japanese-made passenger car with a displacement of 1800 cc, and the evaluated results are shown by an index (larger numbers indicate preferable feelings).

In the tires of the present invention, the longitudinal stiffness was lessened and the riding comfort was improved. On the other hand, the lateral stiffness was not decreased and no lowering in the measured corning power could be observed.

Figure 4:
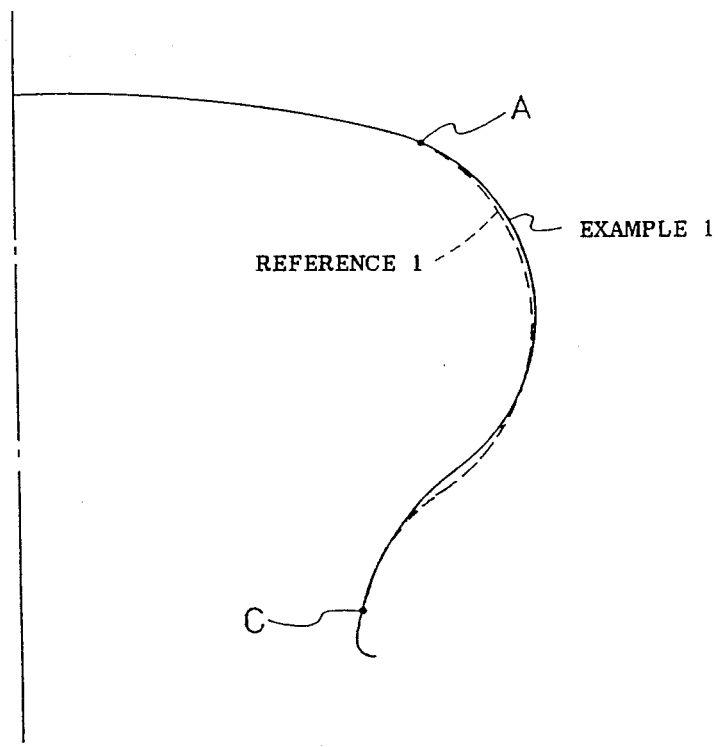
FIG. 4 is a schematic view showing a carcass line according to the present invention and a carcass line of a reference tire.

FIG. 4 shows the comparison of the carcass line profiles in Working example 1 and reference tire 1. In this drawing, the lengths of carcass line from point A to point C are identical.

As apparent from the above test results, riding comfort of depressed radial tires having the aspect ratio of 65% or less according to the present invention, could be improved without spoiling the steering stability.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

TABLE 1

|  |  | Ex. 1 | Ex. 2 | Ex. 3 | Ref. 1 | Ex. 4 | Ref. 2 |
| --- | --- | --- | --- | --- | --- | --- | --- |
| Tire size |  | 185/60 R14 | 185/60 R14 | 185/60 R14 | 185/60 R14 | 195/65 R14 | 195/65 R14 |
| Aspect ratio/100 |  | 0.60 | 0.60 | 0.60 | 0.60 | 0.65 | 0.65 |
| Belt width | WB (mm) | 138 | 138 | 138 | 138 | 148 | 148 |
| Carcass height | H1 (mm) | 99 | 99 | 100 | 99 | 111 | 111 |
| Height at maximum width | H2 (mm) | 61 | 63 | 62 | 60 | 67 | 65 |
| Bead reinforcing member hight | H3 (mm) | 41 | 45 | 41 | 41 | 45 | 45 |
| Radius of upper arc | R1 (mm) | 32.4 | 29.5 | 30.0 | 35.3 | 40.0 | 42.0 |
| Radius of lower arc | R2 (mm) | 43.5 | 58.0 | 45.0 | 30.5 | 56.0 | 45.0 |
| R1/R2 |  | 0.745 | 0.509 | 0.667 | 1.157 | 0.714 | 0.933 |
| (WB/H1) × (Aspect ratio/100) |  | 0.836 | 0.836 | 0.828 | 0.836 | 0.867 | 0.867 |
| R2/H1 |  | 0.439 | 0.585 | 0.450 | 0.308 | 0.505 | 0.405 |
| H3/H2 |  | 0.672 | 0.714 | 0.661 | 0.683 | 0.672 | 0.692 |
| Longitudinal deflection | (mm) | 20.8 | 20.5 | 21.0 | 20.1 | 25.2 | 24.0 |
| Longitudinal stiffness | (kg/mm) | 19.0 | 19.8 | 18.9 | 20.1 | 18.1 | 18.9 |
| Lateral stiffness | (kg/mm) | 14.3 | 15.6 | 14.7 | 14.4 | 13.2 | 13.1 |
| Cornering power | (kg/deg) | 111 | 113 | 109 | 109 | 99 | 98 |
| Riding comfort, feeling index |  | 105 | 110 | 115 | 100 | 105 | 100 |
| Conditions of bench test |  |  |  |  |  |  |  |
| Rim size |  | 5½-JJ × 14 | 5½-JJ × 14 | 5½-JJ × 14 | 5½-JJ × 14 | 6-JJ × 14 | 6-JJ × 14 |
| Air pressure | (kg/sq.cm) | 2.0 | 2.0 | 2.0 | 2.0 | 2.0 | 2.0 |
| Load | (kg) | 350 | 350 | 350 | 350 | 400 | 400 |

What is claimed is:

1. A radial tire having an aspect ratio of 65% or less, comprising:
    a pair of bead cores disposed in bead portions of the tire;
    a carcass having at least one ply of cords turned up at its ends around bead cores, and defining a carcass line; and
    a belt on the carcass, having at least two plies of metallic cords, and defining a belt width, characterized in that
    the carcass line ranging from a point under the edge of the belt to a point adjacent the upper end of the bead core comprises only two arcs of an upper arc having a center of curvature located inside the tire and a lower arc having a center of curvature located outside the tire; and
    the radius of curvature of the upper arc divided by the radius of curvature of the lower arc is less than 0.8.

2. The radial tire as set forth in claim 1, wherein the product of the belt width/carcass sectional height ratio and the aspect ratio is larger than 0.8.

3. The radial tire as set forth in claim 1 or claim 2, wherein the radius of curvature of the lower arc is in a range of 0.4 to 0.6 times the carcass sectional height.

4. The radial tire as set forth in claim 1, wherein the center of the upper arc is located on a line extending generally parallel to the tire axis from a maximum tire section width point, the center of the lower arc is located on the bead base line, and a point of inflection between the upper and lower arcs is located between the maximum tire section width point and said point adjacent the upper end of the bead core.

5. The radial tire as set forth in claim 2, wherein the center of the upper arc is located on a line extending generally parallel to the tire axis from a maximum tire section width point, the center of the lower arc is located on the bead base line, and a point of inflection between the upper and lower arcs is located between the maximum tire section width point and said point adjacent the upper end of the bead core.

6. The radial tire as set forth in claim 3, wherein the center of the upper arc is located on a line extending generally parallel to the tire axis from a maximum tire section width point, the center of the lower arc is located on the bead base line, and a point of inflection between the upper and lower arcs is located between the maximum tire section width point and said point adjacent the upper end of the bead core.

* * * * *